INVENTOR
Edgar D. Lilja
BY
Parker, Carlson, Pitzner + Hubbard
ATTORNEYS

Feb. 23, 1943.　　　　E. D. LILJA　　　　2,311,673
CONDITION CONTROL
Filed Aug. 2, 1940　　　　3 Sheets-Sheet 2

Fig. 2.

INVENTOR
Edgar D. Lilja
BY
Parker, Carlson, Pitzner + Hubbard
ATTORNEYS

Patented Feb. 23, 1943

2,311,673

UNITED STATES PATENT OFFICE 2,311,673

CONDITION CONTROL

Edgar D. Lilja, Rockford, Ill., assignor to Barber-Colman Company, Rockford, Ill., a corporation of Illinois Application August 2, 1940, Serial No. 350,001

13 Claims. (Cl. 172—239)

This invention relates to the automatic control of physical, chemical, or electrical conditions by modulating the position of a regulating device first by a primary response by which the position of the device is changed in proportion to the controlling condition change and then by a delayed secondary response causing further slower movement of the device until the condition has been restored to a predetermined value.

The general object is to provide a control of the above character which is simple and rugged in construction, reliable in operation, which will respond accurately to a wide variety of condition changes, and which is easily adjusted to suit widely varying operating conditions.

Another object is to provide novel means for controlling the primary and secondary actions in response to condition changes.

A more detailed object is to initiate the primary and secondary responses by the movements of two arms actuated in unison with condition changes, the arm controlling the primary response being yieldably moved to permit of its control of the primary or proportioning action.

A further object is to provide for actuation of the primary and secondary response controls mechanically through the intermediary of a power actuator governed by a sensitive electric circuit directly responsive to an electric quantity which varies with the condition being controlled.

The invention also resides in the novel manner of adjusting the control to vary the condition value maintained and the amount of droop incident to the proportioning action.

Figure 1:
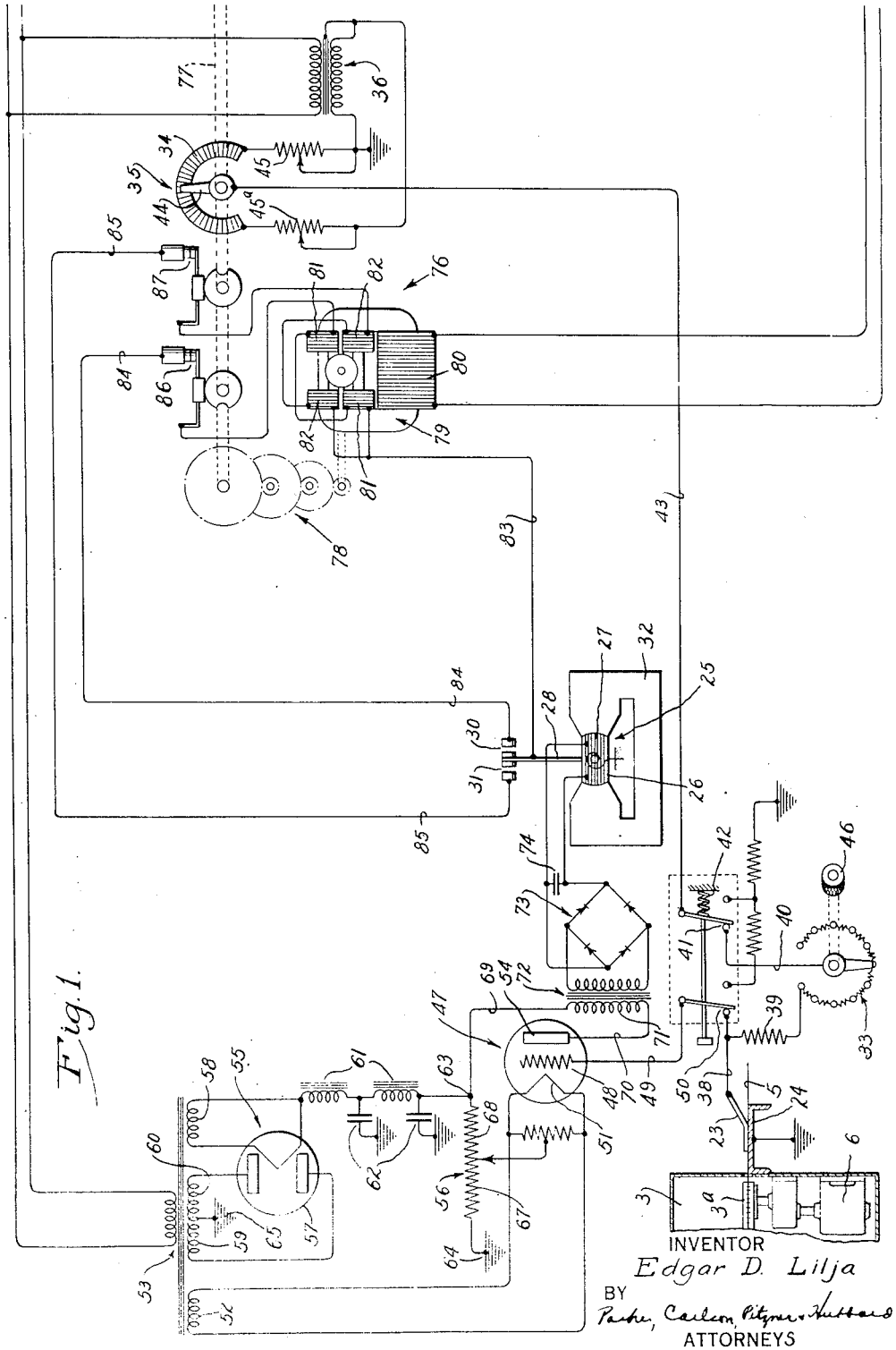

Other objects and advantages of the invention will become apparent from the following detailed description taken in connection with the accompanying drawings, in which Figures 1 and 2, when arranged end to end form a schematic view and wiring diagram of the improved control.

Figure 3:
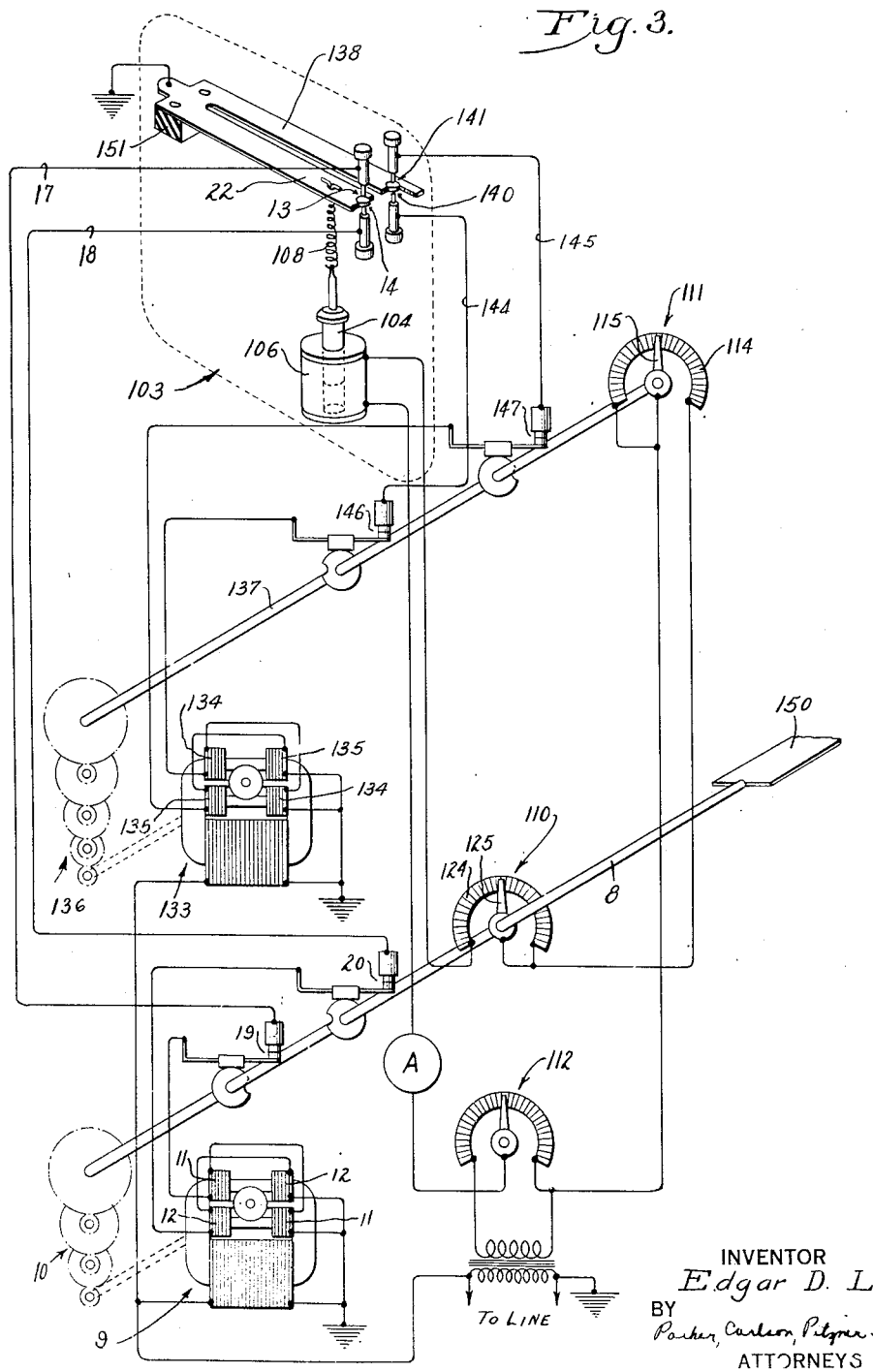

Fig. 3 is a similar view illustrating a different use of the invention.

For purposes of illustration, the invention has been shown in Figs. 1 and 2 as applied to the automatic control of a speed changer 4 for regulating the moisture content of a travelling web 5 of cloth while Fig. 3 illustrates its application to a temperature regulating system. It is to be understood that I do not intend to limit the invention by such typical disclosures but aim to cover all modifications, alternative constructions, and uses falling within the spirit and scope of the invention as expressed in the appended claims.

Referring first to Figs. 1 and 2, the moisture content of the web 5 is varied by a drier (not shown) commonly known as a tenter and having an elongated heated chamber 3 through which the web is advanced by clamps on endless belts 3ª driven by an electric motor 6. The motor speed and therefore the effective capacity of the drier may be varied as by modulating the position of a rotary member 8 (Fig. 2) which is turned in a counter-clockwise direction to increase the brush spacing in the motor and thereby decrease the motor speed. Reverse movement of the shaft results in an increase in speed and a corresponding decrease in the effective capacity of the drier.

The shaft 8 is arranged to be oscillated varying distances back and forth by a reversible electric operator comprising a motor 9 connected to the shaft by speed reduction gearing 10 and having control or shading windings 11 and 12 selectively energizable to cause turning of the shaft slowly in speed-decreasing and speed-increasing directions respectively. Herein, the windings 11 and 12 are short-circuited selectively by closure of switches 13 and 14 having stationary contacts 15 and 16 connected by conductors 17 and 18 to the insulated winding terminals and including the usual cam operated limit switches 19 and 20. The common switch contact 21 is on a flexible tongue 22 which is grounded and thus connected to the grounded terminal of the shading windings.

The switches 13 and 14 are actuated in accordance with changes in the controlled condition, that is, the moisture content of the dried cloth so as to maintain the controlled condition accurately and substantially at a desired value. Such fluctuations are preferably detected by continuously measuring the resistance of the web 5 which varies with the moisture content. The measurement is made at a point beyond the outlet end of the drying chamber 3 as the web passes between two electrodes 23 and 24. These are interposed in an electric circuit, and variations in voltage drop through the cloth are utilized through a suitable vacuum tube arrangement to actuate a sensitive magnetic relay 25 by which selective operation of the control switches 13 and 14 is ultimately governed.

Preferably, the relay is of the D'Arsonval type comprising a rotor 26 carrying a winding 27 and an arm 28 on which the common contact of control switches 30 and 31 is mounted. The rotor is pivotally supported between the poles of a permanent magnet 32 and a return spring is provided so that when the rotor winding is energized to a predetermined degree, the contact arm 28 will balance between the cooperating switch contacts, both control switches then being open. As the current rises above this predetermined value, the switch 30 will be closed. The switch 31 is closed in response to a fall in the relay energizing current.

To impress a voltage upon the cloth sample, the electrodes 23 and 24 are connected in series with a variable resistance 33 and part 34 of a potentiometer 35 which derives its potential from the secondary of a shielded transformer 36 the primary of which is energized from a voltage regulator 37 of the capacitor-reactor type. As shown, the circuit extends from the grounded electrode 24 through the cloth 5, upper electrode 23, a conductor 38, a resistance 39, the resistance 33, a conductor 40, a switch 41 which is normally closed by a spring 42, a conductor 43, the arm 44, the potentiometer portion 34, and an adjustable resistance 45 to ground. By adjustment of the resistance 45 and a similar resistance 45$^a$, the required voltage gradient and range is obtained. The resistance 33 may be varied by manual adjustment of a knob 46 to compensate for variations in the resistance of different kinds and thicknesses of cloth.

The voltage drop between the electrodes is impressed upon an amplifying vacuum tube 47. For this purpose, the conductor 38 is connected to the tube grid 48 through a conductor 49 and a switch 50 normally held in closed position by the spring 42. The tube filament 51 derives its heating potential from the winding 52 of a transformer 53 energized from the regulator 37. High potential current is conveniently supplied to the plate 54 of the tube by a full wave vacuum tube rectifier 55, the output of which is impressed upon a voltage dividing resistor 56. The rectifier circuit includes a vacuum tube 57 having a filament energized from the secondary 58 of the transformer 53. Potential for the plate circuits for the rectifier tube 53 is derived from windings 59 and 60. One side of the rectifier output circuit is extended through a filter comprising chokes 61 and condensers 62 to the terminal 63 of the voltage divider 56. The other side is grounded at 65 and thereby extended to the grounded terminal 64 of the voltage divider.

Section 67 of the voltage divider provides the grid bias for the tube 47 while the section 68 furnishes the plate potential. The plate circuit extends through conductors 69 and 70 and the primary 71 of a transformer 72, the secondary of which serves to energize a full wave dry disk rectifier 73. The D. C. terminals of the latter are connected to the winding 27 of the galvanometer relay 25. A condenser 74 in parallel with the relay serves to filter out some of the cyclic current variations.

The relay 25, acting directly or indirectly through an additional relay, controls a power operator 76 which, following deviation of the controlled condition from the desired normal value, drives the arm 44 of the rheostat 35 in a direction to restore the voltage input to the tube 47 to normal and thereby rebalance the relay. The operator comprises a shaft 77 carrying the rheostat arm 44 and driven through reduction gearing 78 from a reversible electric motor 79 herein shown as of the shaded pole induction type having a main winding 80 constantly energized by alternating current and two sets of shading coils 81 and 82 selectively short-circuited under the control of the relay switches 30 and 31. For this purpose, a conductor 83 connects the common terminal of the coils to the relay arm 28 while the insulated terminals of the coil sets 81 and 82 are connected to the stationary switch contacts by conductors 84 and 85 having cam actuated limit switches 86 and 87 interposed therein.

With the circuit arrangement above described, it will be apparent that a decrease in electrode resistance below normal resulting from an increase in moisture content will cause the A. C. voltage impressed on the grid 48 and the A. C. component of the plate current through the transformer winding 71 to be reduced. The rectified voltage applied to the relay 25 is lowered resulting in closure of the switch 31 and short-circuiting of the coils 82 causing the rheostat arm 44 to turn counter-clockwise. This increases the voltage across the electrodes 23 and 24 and therefore the voltage input to the tube. Such action continues until the electrode potential has been restored to normal and the relay thus rebalanced which stops the motor 79. Conversely, in response to a decrease in moisture content below normal, the input to the tube will increase correspondingly resulting in an increased output current, closure of the relay switch 30, and operation of the motor 79 by the action of the coils 81 until the arm 44 has turned clockwise a distance sufficient to restore normal conditions in the tube.

As a result of the operation described above, the angular positions of the rheostat arm 44 and the shaft 77 will follow accurately the changes in the moisture content of the cloth and these positions constitute a continual indication of the moisture content.

In accordance with the present invention, the movements of the shaft 77 are utilized directly and mechanically to actuate the switches 13 and 14 to produce the primary response of the speed changer proportional to and in a direction to correct for each condition change. To this end, the switch tongue 22 is made relatively flexible and in the present instance is mounted on a lever 90 pivoted at 91. The other end of the lever carries a pivot 92 supporting a floating lever 93 intermediate the ends of the latter. One end of the lever 93 carries a roller 94 which bears against and constitutes the follower of a uniform motion cam 95 fast on the shaft 77. A roller 96 on the other end of the lever 93 follows the periphery of a similar cam 97 on a shaft 98 which may be adjusted angularly by manually turning a knob 99. A spring 100 acts on an arm 101 to urge the lever 90 in a direction to maintain both followers in contact with their cams.

With the foregoing arrangement, it will be observed that turning of the cam 95 when the cam 97 is stationary, will rock the lever 93 about the roller 96 as a fulcrum and thereby swing the lever 90 to a lesser degree about the pivot 91 so as to actuate the switches 13 and 14 in accordance with the condition change. Thus, the apparatus shown in Fig. 1, coacting with the cam 95 and levers 90 and 93, constitute an extremely sensitive condition responsive instrument the effective control point of which is at any time determined by the condition value at which the tongue 22 stands between the contacts 15 and 16. This control point may be varied as desired by manually turning the knob 99. In this movement, the lever 93 is shifted about the roller 94 as a fulcrum producing a corresponding change in the switch tongue position for a given point of engagement of the roller 94 on the surface of the cam 95.

To cause the regulating device or shaft 8 to be positioned with a true proportioning action, means is also provided for shifting the effective control point of the condition-responsive instrument through a narrow range progressively with the movements of the regulating device. Herein, this means comprises an adjustable magnetic relay 103 constantly acting on the tongue 22 to exert a mechanical force which is varied by changing the energization of the relay in accordance with the movements of the shaft 8. Preferably, the relay is of the solenoid type comprising an armature 104 suspended from opposite ends by flexible leaf springs 105 and a coil 106 enclosing the armature. A contractile spring 107 acts constantly on one of the leaf springs to oppose the solenoid pull. The plunger 104 is coupled to the movable contact tongue 22 by coiled contractile springs 108 stretched between the tongue and the leaf springs.

The solenoid coil is maintained energized continuously through a circuit controlled by automatically adjusted rheostats 110 and 111 and a manually adjusted rheostat 112. The circuit extends through a conductor 113, a resistance 114 of the rheostat 111, wiper arm 115, a conductor 116, resistance sections 117 of the rheostat 112, wiper 118, a conductor 119, wiper 120 of a tapped transformer 121, the active portion 122 of the transformer secondary, a conductor 123, resistance 124 of the rheostat 110, wiper 125 and conductor 126 having an ammeter 127 interposed therein. The wiper arm 125 is fast on the shaft 8 and the rheostat is therefore operated to decrease and increase the energization of the coil 106 as the capacity of the drier is decreased and increased respectively.

The proportioning action takes place as follows in response to an increase in the moisture content of the cloth. This results in turning of the cam 95 counter-clockwise through a distance corresponding to the extent of the moisture increase, the switch 13 becoming closed. Such short-circuiting of the windings 11 initiates operation of the motor 9 in a direction to decrease the speed setting of the tenter drive motor. As the shaft 8 turns counter-clockwise, the resistance 124 is decreased progressively thereby correspondingly increasing the energization of the relay 103. After a movement of the speed adjuster proportional to the moisture change, the solenoid pull will have been increased sufficiently to open the switch 13 against the action of the springs 22 and 107 and thereby rebalance the relay and stop the motor.

In response to a decrease in moisture content, the cam 95 will turn clockwise causing closure of the switch 14 and operation of the motor 9 in the speed-increasing direction. The ensuing clockwise movement of the shaft 8 actuates the rheostat arm 125 to decrease the solenoid pull. This continues until the force of the spring 107 overcomes the solenoid pull and the force of the spring tongue 22 and opens the switch 14. As before, the change in the position of the regulating shaft is proportional to the decrease in moisture content. A true proportioning action is thus obtained as an incident to which the effective control point of the control instrument shifts progressively through a narrow range.

This droop or amount of shift of the instrument control point for a given movement of the regulating device may be varied manually by adjustment of the rheostat arm 118. Such adjustment alters the percentage change in the circuit resistance for a given movement of either of the rheostat sliders 115 and 125. In order to avoid a shift in the control point when the droop is changed by adjustment of the rheostat 112, the voltage taps of the transformer 121 are arranged to maintain the current in the solenoid circuit constant when both rheostat sliders 125 and 115 are at their normal mid-positions. This is accomplished by mounting the arms 118 and 120 on a common shaft 130 which may be turned by a knob 131 so that the voltage applied to the circuit will increase in steps as the resistance is increased in corresponding steps.

The means provided herein for producing the secondary response or so-called resetting action to overcome the control point shift incident to the proportioning action above described includes a reversible electric motor 133 arranged to actuate the rheostat 111 at a slow rate and thereby vary the energization of the solenoid 106. The motor has control windings 134 and 135 and its shaft is connected through gearing 136 which drives a shaft 137 at a speed about one-tenth the speed of the shaft 8.

In accordance with the present invention, the motor 133 is controlled directly by movements of the condition-responsive shaft 77. While this may be accomplished by means separately actuated by the shaft, it is preferred to utilize the cam 95 and the levers 90 and 93. Accordingly, the lever 90 carries a second switch arm 138 which preferably is flexible and which supports the movable contact 139 of switches 140 and 141. The stationary contacts 142 and 143 of the latter are connected to the windings 134 and 135 through conductors 144 and 145 having cam actuated limit switches 146 and 147 interposed therein. The movable contact is grounded and therefore connected to the common terminal of the motor windings.

When the moisture content of the cloth is at the value desired to be maintained, the two arms 22 and 138 stand in neutral positions, the relay winding 106 is energized to a predetermined degree and all of the switches will be open. In response to a fall in moisture content, the cam 95 will turn clockwise swinging the lever 90 about the roller 96 in a direction to close the switches 14 and 140. This initiates operation of the motor 9 as above described to cause a relative rapid increase in the setting of the speed controller in proportion to the condition decrease. At the same time, closure of the switch 140 initiates operation of the motor 133 which continues to turn clockwise after the relay 103 has been rebalanced by the proportioning control rheostat 110. As a result of such actuation of the rheostat 111, the solenoid energization is increased slowly until eventually the balance of the relay 103 is again upset in a direction to reclose the switch 14. The motor 9 is thus started again in a direction to increase the speed setting, continuing until the relay 103 is rebalanced by the rheostat 110. This further movement of the regulating device continues intermittently until the moisture content has been raised to the desired value at which time the current energizing the solenoid will have been restored to its normal value and both switches 14 and 140 will be open, both motors 9 and 133 being stopped.

During the proportioning and resetting actions above described, the arm 22 moves independently of the arm 138 in response to changes in the energization of the solenoid produced by the two rheostats. Such response of the switches 13 and 14 without affecting the condition of the switches 140 and 141 is permitted by the flexibility of the arm 22 which is sufficiently stiff however to respond to movements of the lever 90 produced by either of the cams 95 and 97.

The same resetting action occurs following repositioning of the regulator in response to an increase in moisture content. In such a case, the switch 141 is closed and so remains until full restoration of the desired moisture content. Thus, the motor 133 is started in a direction to turn the arm 115 counter-clockwise and thereby cause the switch 13 to be reclosed after the primary response. This causes a further speed decrease and counter-clockwise movement of the shaft 8 to rebalance the relay 103. Such unbalancing and rebalancing continues until the moisture content has actually been restored to the desired value at which the switch 141 will be opened by the action of the cam 95.

Fig. 3 illustrates the adaptation of the improved control to the maintenance of an entirely different condition, namely, temperature. For this purpose, the regulating shaft 8 is arranged to actuate a damper 150 or other suitable device for controlling the capacity of temperature changing apparatus (not shown). To actuate the proportioning control switches 13 and 14 thermostatically, the movable arm 22 may take the form of a resiliently flexible bimetallic strip mounted on and projecting from a support 151. The strip thus constitutes the seat of the force which is created in response to ambient temperature changes and which causes selective actuation of the control switches. As before, this arm is connected by a contractile spring 108 with the armature 104 of a solenoid which cooperates with the switches 13 and 14 to form a balanced relay. In this modification, the resetting control arm 138 is separately actuated and therefore comprises a bimetallic strip which is flexible and may be mounted on the support 151 thereby facilitating adjustment of the two sets of switches in unison.

The operation of the modified system is the same as that shown in Figs. 1 and 2 and therefore the above detailed description will suffice. Briefly, when the temperature surrounding the bimetallic strips 22 and 138 deviates from the desired value determined by the thermostat setting, a switch is closed by each strip, for example, switches 13 and 141. The former starts the motor 9 causing damper movement in a direction to correct for the temperature change while the other starts the resetting motor 133. The primary response takes place rapidly and is terminated as soon as the energization of the solenoid 106 has been changed sufficiently by the rheostat 110 to rebalance the relay 103. Thereafter, the rheostat 111 is actuated by the motor 133 to provide a slower reverse change that unbalances the relay and initiates further operation of the regulator motor in the same direction as before. Such secondary movement occurs intermittently until the temperature changer has responded and affected the thermostatic strip to open the switch 141. The desired condition is thus restored fully both motors stopping with both strips 22 and 138 in neutral position. The primary and secondary responses take place in the same manner when the temperature deviates from the desired value in the opposite direction closing switches 14 and 140 and causing reverse movement of the damper.

I claim as my invention:

1. A control for an apparatus for producing condition changes having, in combination, a device movable varying distances back and forth to increase or decrease the value of said condition, a reversible power operator for actuating said device, a control circuit constantly energized, a relay in said circuit, means in said circuit automatically adjustable with changes in said condition and operable to vary the energization of said relay in opposite directions with opposite condition changes, a second reversible power operator controlled by said relay and having a driven member modulated in accordance with changes in the energization of said relay, means actuated by said second operator to balance the energization of said relay, a pair of control arms moved back and forth by said driven member, means actuated by one of said arms and controlling said first operator to modulate said device in accordance with movements of said member, and means actuated by said other arm and controlling said first operator to cause slow restoration of the controlled condition to a predetermined value.

2. A control for an apparatus for producing condition changes having, in combination, a device movable back and forth to regulate said apparatus and cause the value of the condition controlled thereby to be increased or decreased, a balanced relay, means for variably energizing said relay in accordance with said condition changes, a reversible power operator having a driven element variably controlling the energization of said relay, means responsive to unbalancing of said relay by a condition change to operate said operator and said element in a direction and through a distance sufficient to rebalance the relay, a second reversible power operator for modulating the position of said device, one control means actuated by said element and controlling said second operator to cause an initial movement of said device proportional to the movement of said element, and independent means actuated by said element and controlling said second operator to produce a slower secondary movement of said device in the same direction sufficient to cause said apparatus to restore said controlled condition to a predetermined value.

3. A control for an apparatus for producing condition changes having, in combination, a device movable back and forth to regulate said apparatus and cause the value of the condition controlled thereby to be increased or decreased, a balanced relay, means responsive to changes in a condition to be controlled and operable to vary the energization of said relay with such condition changes, a reversible power operator having a driven element variably controlling the energization of said relay, means responsive to unbalancing of said relay by a condition change to operate said operator and said element in a direction and through a distance sufficient to rebalance the relay, a second reversible power operator for modulating the position of said device, a second balanced electromagnetic relay selectively controlling the operation of said second operator, means actuated mechanically by said element to upset the balance of said second relay in one direction or the other and initiate operation of said second operator, means actuated by the latter to rebalance the second relay, and another means actuated in response to movement of said element out of a predetermined position and operable at a slower rate to upset the balance of said second relay in the same direction as said mechanical means.

4. A control for an apparatus for producing condition changes having, in combination, two interconnected arms mounted on a common support, adjustable means operable to move said arms in unison in opposite directions with opposite condition changes produced by said apparatus, one of said arms being flexible, a pair of switches actuated selectively by movements of said flexible arm in opposite directions from a neutral position, electromagnetic means normally biasing said flexible arm in one direction, a reversible electric motor actuator having a driven member and selectively controlled by said switches to modulate the position of said member, means responsive to the movements of said member to vary the energization of said electromagnetic means progressively in a direction to restore said flexible arm to said neutral position independently of said other arm, a pair of switches similarly actuated by the other arm, and a reversible electric motor driven actuator operable in response to closure of either of said second switches to vary the energization of said electromagnetic means at a slower rate than said first mentioned actuator and in a reverse direction.

5. A control for an apparatus for producing condition changes having, in combination, two arms movable in unison, adjustable means operable to move said arms in opposite directions with opposite condition changes produced by said apparatus, one of said arms being flexible, a pair of devices actuated selectively by movements of said flexible arm in opposite directions from a neutral position, electromagnetic means normally biasing said flexible arm in one direction, a reversible electric motor actuator having a driven member and selectively controlled by said devices to modulate the position of said member, means responsive to the movements of said member to vary the energization of said electromagnetic means progressively in a direction to restore said flexible arm to said neutral position, a second pair of control devices similarly actuated by said other arm, and a reversible electric motor driven actuator operable in response to actuation of either of said second devices to vary the energization of said electromagnetic means at a slower rate than said first mentioned actuator and in a reverse direction.

6. A control for an apparatus for producing condition changes having, in combination, two arms movable in unison, means for deflecting said arms in opposite directions from a neutral position with opposite condition changes produced by said apparatus, one of said arms being flexible, constantly acting means normally biasing said flexible arm in one direction, a reversible power actuator having a driven member and selectively controlled by movements of said flexible arm and operable to modulate the position of said member, means responsive to the movements of said member to vary the biasing force progressively in a direction to restore said flexible arm to said neutral position whereby to proportion the movements of said member to the condition changes, and a second reversible power actuator responsive to movement of said other arm out of neutral position to vary said biasing force at a slower rate than said first mentioned actuator and in a reverse direction.

7. A control for an apparatus for producing condition changes having, in combination, two arms mounted on a lever, means responsive to variations of a controlling condition and operable to deflect the lever in opposite directions from a neutral position with opposite condition changes produced by said apparatus, one of said arms being flexible, a floating lever connected to said first lever, manually operable means for adjusting one point on said floating lever, condition responsive means for moving another point on the floating lever, electromagnetic means normally biasing said flexible arm in one direction, a reversible power actuator controlled by the movements of said flexible arm and operable to vary the energization of said electromagnetic means progressively in a direction to restore said flexible arm to its neutral position, and a second reversible power actuator operable in response to movements of said other arm to vary the energization of said electromagnetic means at a slower rate than said first mentioned actuator and in a reverse direction.

8. A control of the character described having, in combination, a reversible power operator having a driven device, a second reversible power operator having a driven member, variably adjustable means controlling said second operator to modulate the position of said member in proportion to changes in the adjustment, a cam actuated by said member, a flexible arm moved in opposite directions in accordance with movements of said cam, control elements coacting to govern the selective operation of said first operator, one of the elements being movable with said arm, electromagnetic means constantly biasing one of said elements in one direction, and means actuated by said first operator for rebalancing the energization of said electromagnetic means whereby to proportion the movement of said device in accordance with those of said member.

9. A control for apparatus for producing condition changes having, in combination, a device movable varying distances in opposite directions to increase or decrease the value of a condition to be regulated, a reversible power operator for actuating said device, a control circuit constantly energized from a variable voltage source, a relay in said circuit controlling the selective operation of said operator, means variably responsive to changes of said condition produced by said apparatus and operable to vary the balance of said relay in opposite directions with opposite condition changes, means actuated by said operator to rebalance the relay and thereby proportion the movement of said device to the condition change, a variable resistance in said circuit, and manually operable means for adjusting said resistance and simultaneously adjusting said voltage source to maintain the control point of said variably responsive means constant for different values of said resistance.

10. A control for apparatus for producing changes in the condition of a medium having an electrical characteristic which varies with such condition changes, a movable element, electrical means responsive to changes in said characteristic produced by said apparatus and operable to position said element in accordance with such change, a relay the balance of which is controlled mechanically by said element, a device variably movable to regulate said condition, an electric operator responsive to unbalancing of said relay and operable to actuate said device and rebalance said relay, and supplemental means operable by movement of said element to unbalance said relay in a direction opposite to and at a rate slower than the rate of rebalance thereof by said operator.

11. A control for an apparatus for producing changes in an electrical quantity having, in combination, an electric circuit responsive to changes of said quantity, a movable element, mechanism controlled by said circuit and operable to convert changes in said electrical quantity into mechanical changes in the position of said element, a power actuated device for adjusting said apparatus to produce changes in said quantity correcting for deviations in the quantity from a predetermined value, means actuated by the movements of said element to cause corrective movement of said device in proportion to the movement of the element, and means directly responsive to movements of said element to produce further corrective movement of said device at a slow rate to effect restoration of said quantity to said predetermined value.

12. A control of the character described having, in combination, a reversible electric operator having a driven device, a second reversible electric operator having a member driven at a substantially slower speed than said device, two interconnected arms movable in unison and one being flexible for movement relative to the other, adjustable means to exert a force of selectively variable magnitude on both of said arms, switching means having coacting elements relatively movable in opposite directions relative to a balanced position either by said flexible arm or by said member, said switching elements when out of said balanced position controlling said first operator to cause operation thereof in a corresponding direction until the elements are restored to balance, means responsive to the movement of said device to exert a force on one of said elements tending to restore the elements to said balanced position, and secondary control means responsive to the movements of said second arm and controlling said second operator to upset the balance of said elements in a direction corresponding to the direction of movement of the second arm.

13. A control of the character described having, in combination, a reversible power operator having a driven device, a second reversible power operator having a driven member operable at a substantially slower rate than said device, two interconnected arms movable in unison and one being adapted to flex relative to the other, adjustable means to exert a force of selectively variable magnitude on both of said arms, primary control means including coacting elements relatively movable in opposite directions from a balanced position either by said flexible arm or by said member, said elements controlling said first operator to cause operation thereof in one direction or the other until the balance of the elements is restored, means exerting a force on one of said elements varying in magnitude according to the position of said device and acting in a direction to restore the balance of said elements, and secondary control means responsive to the movements of said second arm and controlling said second operator to cause operation thereof in a direction to upset the balance of said elements.

EDGAR D. LILJA.